United States Patent [19]

McDowell et al.

[11] 4,252,777
[45] Feb. 24, 1981

[54] RECOVERY OF ALUMINUM AND OTHER METAL VALUES FROM FLY ASH

[75] Inventors: William J. McDowell; Forest G. Seeley, both of Oak Ridge, Tenn.

[73] Assignee: The United States of America as represented by the United States Department of Energy, Washington, D.C.

[21] Appl. No.: 90,175

[22] Filed: Nov. 1, 1979

Related U.S. Application Data

[63] Continuation-in-part of Ser. No. 934,762, Aug. 17, 1978, abandoned.

[51] Int. Cl.³ .................................................. C01F 7/00
[52] U.S. Cl. ....................................... 423/111; 423/9; 423/10; 423/70; 423/139; 423/125; 423/126; 423/128; 423/132; 423/112
[58] Field of Search ............... 423/126, 132, 111, 125, 423/128

[56] References Cited

U.S. PATENT DOCUMENTS

| 1,125,007 | 1/1915 | Coolbaugh et al. | 423/111 |
| 1,170,418 | 1/1916 | Coolbaugh et al. | 423/111 |
| 1,178,384 | 4/1916 | Coolbaugh et al. | 423/111 |
| 1,310,413 | 7/1919 | Eberhardt | 423/111 |
| 1,891,608 | 12/1932 | Scheidt | 423/131 |
| 2,174,825 | 10/1939 | Freling et al. | 423/132 |
| 4,024,220 | 5/1977 | Ostroff et al. | 423/242 A |
| 4,113,833 | 9/1978 | Eremin et al. | 423/111 |

OTHER PUBLICATIONS

Condry, "Coal Research Bureau, Report No. 130," West Va. Univ., Morgantown, W. Va., Jul. 1976.
DeCarlo et al., "Dept. of Energy Report, ORNC/T-M-6126", Oak Ridge National Lab., Oak Ridge, Tenn., Mar. 1978.

*Primary Examiner*—Herbert T. Carter
*Attorney, Agent, or Firm*—James E. Denny; Stephen D. Hamel; Irving Barrack

[57] ABSTRACT

The invention described herein relates to a method for improving the acid leachability of aluminum and other metal values found in fly ash which comprises sintering the fly ash, prior to acid leaching, with a calcium sulfate-containing composition at a temperature at which the calcium sulfate is retained in said composition during sintering and for a time sufficient to quantitatively convert the aluminum in said fly ash into an acid-leachable form.

6 Claims, 4 Drawing Figures

UNSINTERED FLY ASH     POST-SINTERED CRYSTALLINE MATRIX

RECOVERY OF ALUMINUM AND OTHER METAL VALUES FROM FLY ASH

BACKGROUND OF THE INVENTION

This invention was made in the course of, or under, a contract with the United States Department of Energy. It relates to a method for recovering aluminum and other metal values from fly ash.

This application is a continuation-in-part of our co-pending application Ser. No. 934,762, now abandoned.

As used herein, the term "fly ash" is used to refer to the ash produced by and from the combustion of powdered or other particulate forms of coal in power station boilers or entrained ash carried over from a gasifier as typically recovered from flue gases or stacks, such as by electrostatic precipitation.

Structurally, the fly ash to be treated for metal value recovery in accordance with this invention comprises a mass of refractory glassy, non-crystalline micron-size spheroidal particles derived from coal that has been fired to a temperature of about 1750° C. as shown in electron microphotograph, FIG. 1a. A typical chemical composition of fly ash as derived from burning coal in a Tennessee Valley Authority steam plant is given in Table I below.

TABLE I

Analysis of Fly Ash From A TVA Steam Plant

| Constituent | wt. % | Constituent | wt. % |
|---|---|---|---|
| $SiO_2$ | 49.4 | Si | 23.1 |
| $Al_2O_3$ | 27.96 | Al | 14.8 |
| $Fe_2O_3$ | 10.77 | Fe | 7.53 |
| $MnO_2$ | 0.30 | Mn | 0.19 |
| CaO | 1.51 | Cu | 1.08 |
| MgO | 1.38 | Mg | 0.83 |
| $TiO_2$ | 1.68 | Ti | 1.01 |
| $K_2O$ | 3.14 | K | 2.61 |
|  |  | C | 2.6 |

| Minor Constituents, ppm | | | |
|---|---|---|---|
| Ba | 350 | Rb | 140 |
| Co | 50 | Sn | 25 |
| Cr | 120 | Sr | 750 |
| Cu | 130 | U | 15 |
| Ga | 50 | V | 180 |
| Ni | 80 | Zn | 200 |
| Pb | 60 | Zr | 270 |
| Ra,PCi/g | 5 | | |

In 1975, about 42 million tons of fly ash was generated from burning coal in power plants in the United States; and, in 1985, it is estimated that the fly ash generated in the utilization of coal for power and fuel production will increase to over 140 million tons. This taken in combination with the chemical analysis profile shown in Table I indicates that fly ash represents a significant and relatively cost-free source inventory of aluminum and other valuable metals provided that technically efficient methods are available for their recovery. It is, therefore, a principal object of the present invention to teach and provide a novel and efficacious method for recovering aluminum and other metal values as an oxide or salt from fly ash as produced by modern-day coal-burning power plants. Another object is to provide a method for recovering aluminum which is virtually self-contained in the sense that the reagents or starting materials are products of coal combustion or products resulting from the treatment of gaseous effluents resulting from coal combustion. An additional object is to provide a process which not only allows recovery of aluminum from fly ash but has sufficient flexible process parameters to allow efficient recovery of other metal values contained therein such as iron, titanium, thorium, and uranium. These and other objects are realized by converting the refractory glassy-type spheroidal particles of fly ash into a crystalline structure from which the aluminum is readily recovered by leaching with strong inorganic acids, such as sulfuric acid, nitric acid, and aqueous solutions thereof.

Acid leaching of the non-crystalline fly ash particles does not result in sufficient dissolution of aluminum. For example, an aqueous suspension of fly ash (i.e., one containing about 20 percent solids as fly ash) using 16 molar nitric acid in one case and up to 36 molar sulfuric acid in another will dissolve no more than about 10 percent of the aluminum contained in the fly ash at ambient temperatures, i.e., about 20° C. over a period of 72 hours. Greater amounts of aluminum are recovered by leaching under reflux conditions for extended periods of time; and even then no more than about half the aluminum is dissolved in the acid leachants. For example, using an acid such as $H_2SO_4$ at concentrations ranging from 3 to 36 normal over a 6-hour leaching time under reflux conditions, a maximum aluminum dissolution of only 54 percent has been achieved.

SUMMARY OF THE INVENTION

Figure 1:
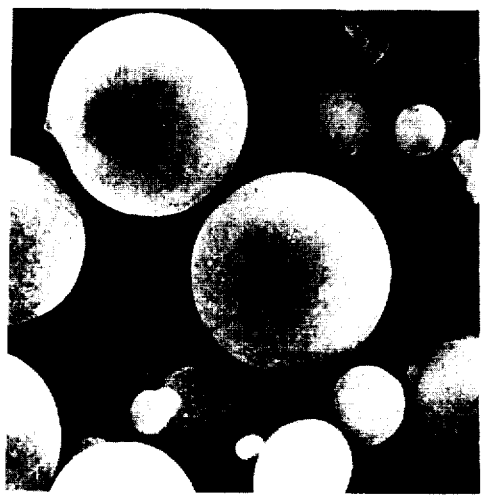
FIG. 1 shows two scanning electron photomicrographs at 3000 times magnification showing the characteristic refractory glass-type spheroidal structure of fly ash in FIG. 1a as opposed to the crystalline structure developed after sintering the fly ash with a calcium sulfate-calcium carbonate mixture as shown in FIG. 1b.
Figure 1:

According to the present invention quantitative recovery of aluminum from fly ash is achieved by heating mixtures of fly ash and calcium sulfate or mixtures of fly ash with calcium sulfate and at least one material selected from the group consisting of calcium carbonate, magnesium sulfate, or magnesium carbonate; or a sludge comprising a mixture of calcium sulfate, calcium sulfite and calcium carbonate (resulting from treating the stack gas of a coal-burning power plant with a limestone slurry to remove sulfur dioxide therefrom) at a temperature and for a time sufficient to convert the glassy spheroidal particles of fly ash into a crystalline structure from which the aluminum is readily and quantitatively dissolved into aqueous inorganic acid leachants, such as sulfuric, nitric, or hydrochloric acid, or aqueous solutions thereof.

In order to produce the desired crystalline structure, the fly ash-calcium sulfate-containing mixtures are heated to temperatures in the range 800°–1300° C. using a temperature profile which typically consists of raising the temperature rapidly up to 400° C. and then at a rate in the range 1° to 2° C. per minute until the crystal-producing range of temperature is reached and maintained for a period of about 1 to 2 hours. While chemical leachability of the desired aluminum and other metal values is high even at temperatures greater than 1300° C., the sintered material becomes exceedingly refractory in nature and difficult to grind—a step which may precede chemical leaching. The exact temperature profile to be used for a given batch of fly ash to attain the desired crystalline aluminum-leachable condition will vary according to the source and composition of the fly ash starting material and the ratio of fly ash to calcium sulfate and other additives which are heated or sintered along with the fly ash to attain the desired aluminum-leachable condition. It is sufficient to note that the objects of this invention will be obtained by sintering a mixture of fly ash with calcium sulfate (or by sintering with a $SO_2$ scrubber sludge) at a temperature in the range 800° C. to 1300° C. to form a material from which aluminum and other metal components contained therein can be leached quantitatively.

The presence of calcium sulfate as a component in the sintering mixture serves as a fluxing material to minimize the temperature at which the glassy non-crystalline fly ash will sinter to produce the desired acid-soluble product and to provide the sulfate anion for aiding in the generation of aqueous-soluble metal components in the leaching step. At the sinter temperatures used in our process little, if any, sulfate is lost from any of the proposed sinter mixtures as is indicated by the analysis in Table II below. This is to be contrasted with the product of burning a calcium salt, such as calcium sulfate, in a furnace with combustible coal composition where the sulfate anions would be essentially, if not all, decomposed. At the coal-combustion temperatures, typically temperatures in excess of at least 1500° C. the fluxing action of the calcium sulfate would be lost. At the same time an undesirable dilution of the fuel coal charge in the furnace would occur resulting in a concomitant decrease in energy output per given coal charge.

TABLE II

STABILITY OF CALCIUM SULFATE, SCRUBBER SLUDGE, CALCIUM CARBONATE AND MIXTURES OF THE THREE AT TEMPERATURES UP TO 1200° C.

| Composition | Init. Wt. | Temp. | Final Wt. | Total S (As $SO_4$)* |
|---|---|---|---|---|
| $CaSO_4$ | 10.0g | — | — | 19.8% |
|  | 10.0g | 1000 | 8.0g | 25.7% |
|  | 10.0g | 1100 | 8.0g | 26.5% |
|  | 10.0g | 1200 | 7.9g | 25.7% |
| Scrubber Sludge ($CaSO_4$—$CaSO_3$—$CaCO_3$) | 20.0g | — | — | 22.2% |
|  | 20.0g | 400 | 19.5g | 21.1% |
|  |  | 600 | 19.5g | 24.8% |
|  |  | 800 | 17.5g | 25.1% |
|  |  | 1000 | 17.0g | 25.7% |
|  |  | 1200 | 17.5g | 26.1% |
| Fly Ash, Scrubber Sludge, $CaCO_3$ | 30.0g | — | — | 1.92% |
|  | 30.0g | 1000 | 23.9g | 3.11% |
|  | 30.0g | 1100 | 23.9g | 3.41% |
|  | 30.0g | 1200 | 23.1g | 3.24% |

*Increase in total S due to loss of $H_2O$

Figure 2:
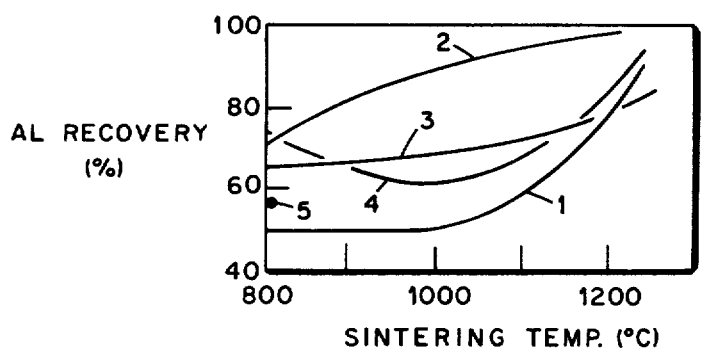
FIG. 2 shows the effect of sintering temperature on aluminum recovery using various sintering additives to the fly ash to promote crystallization and create a metal-leachable condition.

In order to produce the desired crystalline structure from fly ash of the composition shown in Table I, a pelletized mixture with calcium sulfate by itself or in combination with calcium carbonate, magnesium sulfate, or magnesium carbonate is sintered, i.e., heated in an ambient atmosphere rapidly to a temperature 400° C. and then at a rate of about 1° to 2° C. per minute until the optimum crystalline-producing temperature is reached and maintained for a period of from 1 to 2 hours. The optimum sintering temperature to achieve maximum aluminum leachability for the fly ash composition of Table I is shown in the curves and data points marked on FIG. 2 where curve 1 shows the aluminum recovery resulting from the addition of two parts by weight calcium sulfate to 1 part of fly ash; curve 2 shows the extent of aluminum recovery attainable using a 1:1:1 weight ratio of calcium sulfate, calcium carbonate, and fly ash; curve 3 shows the aluminum recovery attainable using a 1:1:1 ratio of calcium sulfate-magnesium sulfate and fly ash; curve 4 shows the aluminum recovery using a 0.7:0.7:0.7:1 weight ratio of calcium sulfate, calcium carbonate, magnesium sulfate, and fly ash; and the data point 5 shows the aluminum recovery obtainable with equal amounts of calcium sulfate, magnesium carbonate, and fly ash. It is seen that the addition of magnesium carbonate to the sintered mixtures improves aluminum recovery above that obtained from the use of calcium sulfate alone; that the addition of magnesium sulfate to a mixture of calcium sulfate and calcium carbonate appears to depress aluminum recovery somewhat in the temperature region of 1200° C., while the addition of magnesium sulfate in the absence of calcium carbonate enhanced aluminum recovery. Maximum aluminum recovery is obtained by the use of equal parts of calcium sulfate, calcium carbonate, and fly ash.

It should be noted that all of the sintering aid mixtures contain calcium sulfate. Sintering with calcium carbonate does not produce the desired easily leachable condition. While we do not wish to be bound by any specific reaction mechanism, the sulfate apparently serves not only to aid sintering by its action as a fluxing agent but also to provide sufficient sulfate ion to convert the aluminum to a readily acid-leachable aluminum sulfate form in accordance with the reaction.

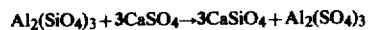

$$Al_2(SiO_4)_3 + 3CaSO_4 \rightarrow 3CaSiO_4 + Al_2(SO_4)_3$$

After the sintering operation, the sintered mixture is cooled and then ground to powder, preferably in the range 60 to 100 mesh (U.S. sieve size) in order to provide maximum surface exposure to an aqueous acidic leachant, such as sulfuric acid. It is convenient, but not necessary, that the leaching operation occur in two steps in which the first step involves a pugging leach where a paste-like consistency mixture is formed by contacting the sintered mass with concentrated, i.e., 36 N, sulfuric acid and then diluting the pugged leach to an acid concentration of from 2–8 N and a solids content ranging from 5 to 20 percent. This dilution takes advantage of the heat of solution of the sulfuric acid to provide a heated acidic leach solution which promotes aluminum dissolution. Aluminum recovery as a function of sulfuric acid concentration with and without the initial pugging leach step is shown in Table III below.

TABLE III

Effect of Sulfuric Acid Concentration On Aluminum Recovery

Preparative Conditions: sinter CaSO$_4$-CaCO$_3$-fly ash (1:1:1); temp., 1100° C.; time, 2 hr; leach, pugging, 3 hr, dilute, 16 hr. temp., reflux

| H$_2$SO$_4$ Conc., N | Initial Pugging Leach | Aluminum Leached, % |
|---|---|---|
| 2 | None | 79 |
| 4 | None | 79 |
| 8 | None | 80 |
| 16 | None | 89 |
| 2 | Yes | 82 |
| 4 | Yes | 86 |
| 8 | Yes | 86 |
| 16 | Yes | 86 |

It is seen from Table III, above, that samples of fly ash which had been sintered at 1100° C. with a calcium sulfate-calcium carbonate mixture resulted in aluminum recovery ranging from 79–89 percent over the acid concentration range 2–16 N H$_2$SO$_4$. By increasing the temperature to no more than about 100° C., aluminum recoveries greater than 90% of the original aluminum content can be achieved.

REPRESENTATIVE EXAMPLE

A sample of fly ash that had been sintered with 2 parts (by weight) CaSO$_4$ at 1450° C. was leached with concentrated sulfuric acid for 3 hours (as a slurry containing 40 percent solids) and then diluted to about 20 percent solids for an additional 3-hour leaching. Analyses showed that 98% of the Al, 96% of the Fe, 94% of the Ti, and 82% of the U in the fly ash had dissolved in the leachant solution.

A PREFERRED EMBODIMENT

The discovery that sintered mixtures of fly ash and calcium sulfate-containing compositions will render the resultant sintered material available for quantitative leaching of aluminum permits the process of the present invention to be carried out by using waste products resulting from coal combustion. For example, the removal of sulfur dioxide from the waste gases resulting from the combustion of coal is being increasingly accomplished by passing the sulfur dioxide containing effluent gases through a slurry of lime (CaO) or limestone (CaCO$_3$). These materials react with sulfur dioxide to produce a sludge containing varying amounts of calcium sulfate, calcium sulfite, and unreacted lime or limestone which, we have found, after dewatering, serve as useful materials in combination with the fly ash to produce an acid leachable aluminum after exposure to a suitable sintering operation. Calcium sulfite will be readily converted to calcium sulfate during sintering of the fly ash dewatered sludge mixture. Furthermore, when sulfuric acid is used as the leachant, a considerable amount of the acid needed to serve as aluminum dissolution medium will be generated during the production of the finally desired product, alumina.

Figure 3:
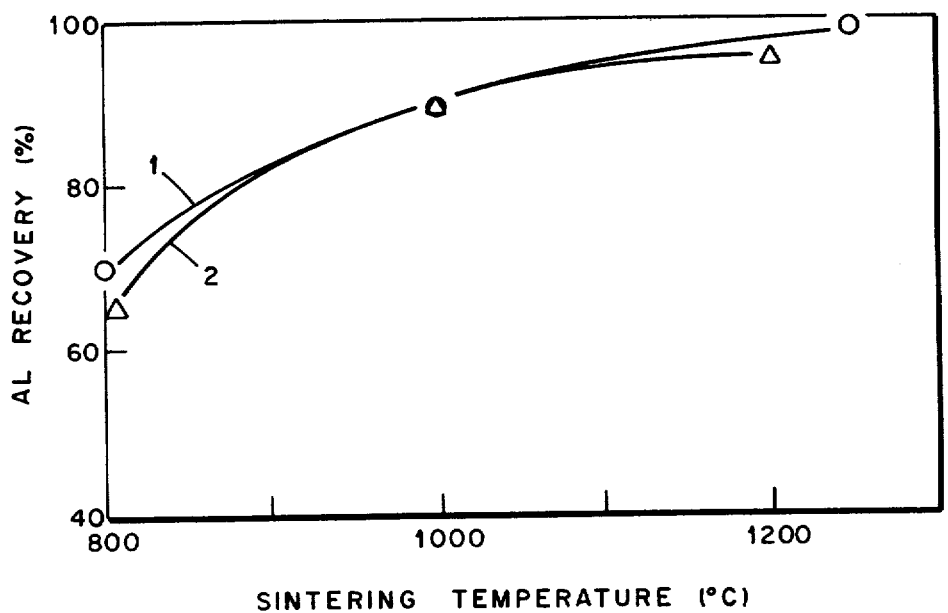
FIG. 3 shows two curves comparing the recovery of aluminum from a $CaSO_4$-$CaCO_3$ flux medium against a flux medium involving a scrubber sludge and calcium carbonate.

The following example illustrates a preferred mode of practicing the inventive concept embodied in the aluminum recovery process herein-disclosed utilizing a lime slurry used for the removal of sulfur dioxide from a coal-fired power plant stack gas removal system. The resultant sludge material produced after sorption of SO$_2$ was dewatered and mixed with varying amounts of fly ash and calcium carbonate and then sintered in air at temperatures in the range 800°–1200° C. The sintered compositions were cooled and then leached with 8 N sulfuric acid. The effect of sintering temperatures on aluminum recovery is displayed on the curves of FIG. 3. Curve 1 shows the extent of aluminum recovery utilizing a 1:1:1 weight ratio of calcium sulfate-calcium carbonate-fly ash composition; curve 2 shows the aluminum recovery obtained from a 1:1:1 scrubber sludge-calcium carbonate-fly ash sintered composition. The results show that aluminum recovery improved as the sintering temperature increased from 800° C. to 1200° C. and is essentially the same whether calcium sulfate-calcium carbonate or scrubber sludge-calcium carbonate is used. The sintered pellets were then crushed and leached with 8 N H$_2$SO$_4$ in standard pugging and dilution leaches.

It should be noted that as the ratio of scrubber sludge or of calcium sulfate-containing additives-to-fly ash increases, the total aluminum present decreases so that a point may be reached where excessive dilution of the fly ash may negate the advantage realized by the sintering operation. In general, negative dilution effects will be avoided if the ratio of calcium sulfate-containing additive-to-fly ash does not exceed an additive-to-fly ash weight ratio of about 2:1.

A major advantage of the sinter-leach method herein described is the great operational flexibility possible once the sinter and leach operation has been effected. This flexibility is illustrated by reference to the flow sheet shown in FIG. 4 where the basic sinter-leach operation is shown to occur by sintering a pelletized mixture of fly ash with a calcium sulfate-containing material including SO$_2$ scrubber dewatered sludge. The sintered mass is then ground to a powder, for example, in the range 40 to 100 mesh (U.S. sieve size series) and then subjected to a two-stage leaching involving a pugging leach with concentrated sulfuric acid followed by dilution to a solution containing 10 to 20 percent solids. Any insoluble solids are filtered whereupon an aluminum sulfate solution is available from which an alumina or aluminum chloride product is readily obtainable. Thus, the solution from the sulfuric acid leaching circuit can be subjected to evaporative crystallization of the sulfate salt of aluminum after which alumina, Al$_2$O$_3$, can be recovered as a moderately impure product by calcination of the aluminum sulfate. If, on the other hand, one wishes to obtain an alumina product of higher purity or take advantage of the fact that several other resource metals are available for relatively easy recovery from the leach solution, the aluminum sulfate solution can be subjected to a liquid-liquid extraction technique in which such dissolved metal values, such as iron, titanium, uranium, and thorium are selectively extracted into an organic phase comprising 30 weight percent of a high molecular weight primary amine dissolved in an inert organic diluent such as Primene JM-T—a trade designation of a class of high molecular weight primary amines (obtainable from Rohm and Haas Company) having the generic formula RR'R"C—NH$_2$ where R, R', and R" represent alkyl groups totalling from 18–22 carbon atoms. The aluminum-containing aqueous raffinate is then evaporated to form an aluminum sulfate crystalline mass which can, as before, be calcined, this time to a highly purified alumina product. Stripping of the organic phase with alkali carbonate solution or various concentrations of sulfuric acid higher than 0.2 M allows recovery of the iron, titanium, uranium, thorium, and other extractable metals which then can be separately recovered by standard techniques. For example, the uranium can be isolated by using a phosphoric acid stripping solution, adjusting the uranium to the uranyl oxidation state, selectively extracting the uranyl ions into a synergistic organic extractant comprising di-2-ethylhexyl phosphoric acid and trioctyl phosphine oxide dissolved in an inert organic diluent and then selectively stripping the uranium therefrom with a reductive stripping solution comprising an aqueous solution of phosphoric acid containing ferrous ions as described in U.S. Pat. No. 3,711,591 to Hurst et al. Sulfuric acid generated from calcination of the crystallized aluminum sulfate can be recovered and recycled to provide the acid necessary for aluminum leaching of the sintered fly ash material.

Figure 4:
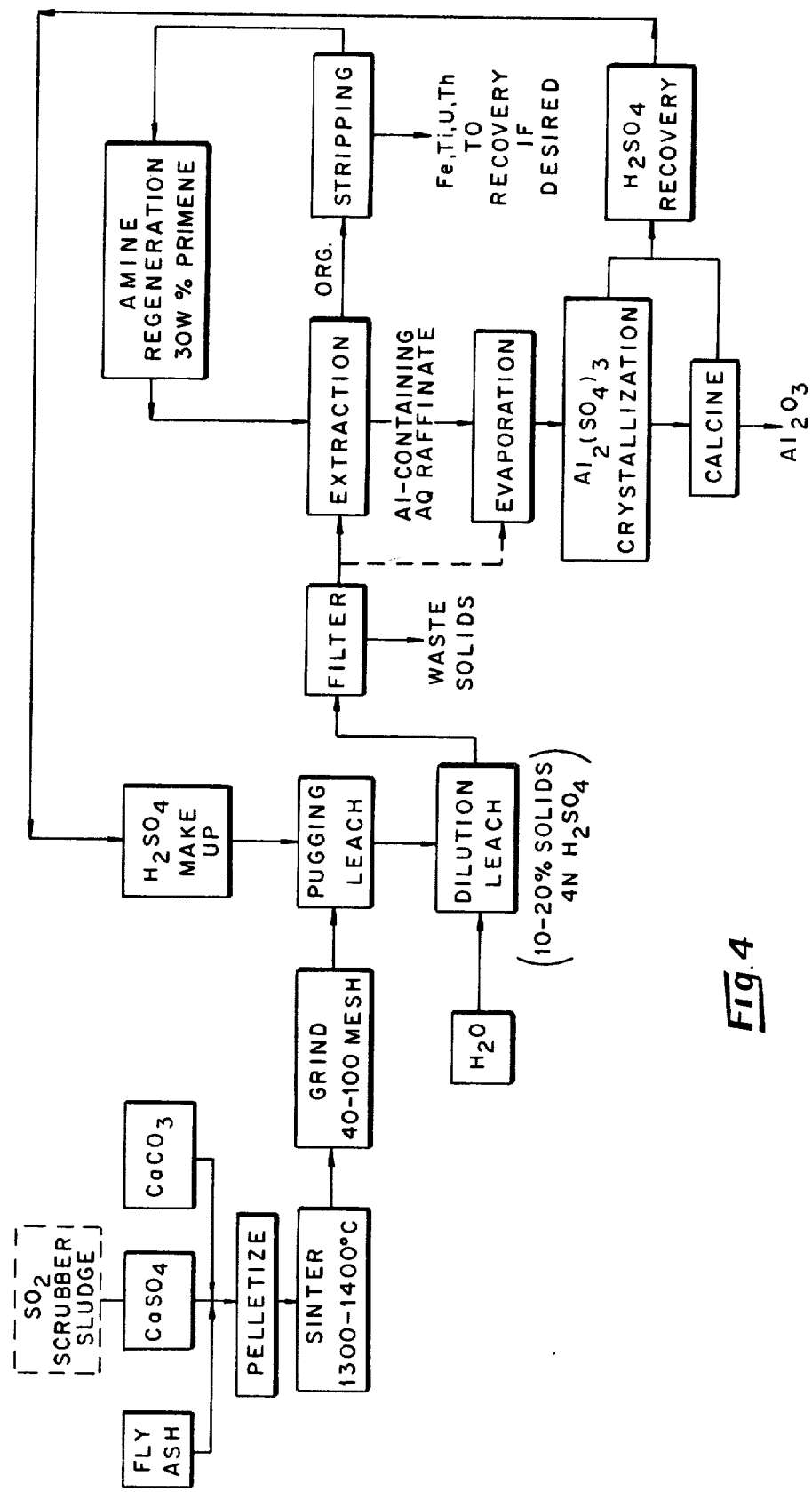
FIG. 4 is a flow sheet which outlines the basic steps in converting the fly ash into a metal-leachable condition and then traces the resultant aluminum solution through the steps which lead to a desired alumina product, or, if desired, an aluminum chloride product—each of which is amenable for conversion into elemental aluminum by well-known electrolytical processes.

The flow sheet shown in FIG. 4 also permits production of aluminum chloride final product. This product can easily be obtained by concentrating the aluminum sulfate solution to about 70 percent by weight sulfuric acid, after which aluminum chloride can be precipitated from the solution by the addition of gaseous hydrogen chloride leaving iron in the solution. And finally, the flow sheet illustrated in FIG. 4 can be easily modified to utilize a nitric acid leachant solution using up to 10 molar nitric acid. In that case, the resultant aluminum nitrate solution can be purified of metallic impurities by liquid-liquid solvent extraction with di-2-ethylhexyl phosphoric acid dissolved in an inert organic diluent such as a kerosene-type diluent. The resultant aluminum nitrate raffinate solution can then be converted to a desired alumina product by subsequent evaporation, crystallization of the resultant aluminum nitrate and finally by calcination of the aluminum nitrate to alumina.

What is claimed is:

1. A method for improving the acid leachability of aluminum and other metal values found in fly ash which comprises sintering the fly ash, prior to acid leaching, with a calcium sulfate-containing composition at a temperature at which the calcium sulfate is retained in said composition during sintering and for a time sufficient to quantitatively convert the aluminum in said fly ash into an acid-leachable form.

2. The method according to claim 1 in which the sintering temperature is in the range 800°–1300° C.

3. The method according to claim 1 in which the calcium sulfate-containing composition is selected from the group consisting of calcium sulfate, mixtures of calcium sulfate with magnesium sulfate or calcium carbonate or the sludge resulting from treating $SO_2$-containing effluents with lime or limestone.

4. The method according to claim 1 in which the acid leachant is sulfuric acid and aqueous solutions thereof.

5. The method according to claim 1 in which the acid leachant is nitric acid or aqueous solutions thereof.

6. The method according to claim 1 in which the acid leachant is hydrochloric acid or aqueous mixtures thereof.

* * * * *